(12) United States Patent
Bodziony et al.

(10) Patent No.: US 12,189,620 B2
(45) Date of Patent: Jan. 7, 2025

(54) CREATING VIRTUALIZED DATA ASSETS USING EXISTING DEFINITIONS OF ETL/ELT JOBS

(71) Applicant: International Business Machines Corporation, Armonk, NY (US)

(72) Inventors: Michal Bodziony, Tęgoborze (PL); Bartosz Tomasik, Cracow (PL); Wojciech Mis, Cracow (PL); Marcin Filip, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 17/462,349

(22) Filed: Aug. 31, 2021

(65) Prior Publication Data
US 2023/0066110 A1    Mar. 2, 2023

(51) Int. Cl.
*G06F 16/24* (2019.01)
*G06F 16/2453* (2019.01)
*G06F 16/2455* (2019.01)
*G06F 16/25* (2019.01)

(52) U.S. Cl.
CPC .. *G06F 16/24535* (2019.01); *G06F 16/24565* (2019.01); *G06F 16/254* (2019.01); *G06F 16/256* (2019.01)

(58) Field of Classification Search
CPC combination set(s) only.
See application file for complete search history.

(56) References Cited

U.S. PATENT DOCUMENTS

| | | | | |
|---|---|---|---|---|
| 7,523,118 B2 * | 4/2009 | Friedlander | ........... | G06F 16/283 |
| 7,761,408 B2 * | 7/2010 | Agarwal | ............. | G06F 16/9535 |
| | | | | 707/602 |
| 8,577,833 B2 * | 11/2013 | Erla | ...................... | G06F 16/254 |
| | | | | 707/602 |

(Continued)

FOREIGN PATENT DOCUMENTS

EP    2079020 A1 *  7/2009

OTHER PUBLICATIONS

Oliveira et al., "Using BPMN for ETL conceptual Modeling: A Case Study". IEEE 2021.*

(Continued)

*Primary Examiner* — Daniel A Kuddus
(74) *Attorney, Agent, or Firm* — Shackelford, McKinley & Norton, LLP; Robert A. Voigt, Jr.

(57) ABSTRACT

A computer-implemented method, system and computer program product for creating virtualized data assets. A copy of an extract, transform, load (ETL) or an extract, load, transform (ELT) job definition is created. Furthermore, a table function is created in which the table function is configured to trigger the execution of a copy of the ETL/ELT job definition, to read the resulting data from executing the copy of the ETL/ELT job definition and to return the resulting data (data sets), such as in a queue in a federation server. After receiving a query from a user based on a virtual view in which the query includes the ETL/ELT job definition, the table function is executed which triggers execution of the copy of the ETL/ELT job definition. Data sets are then produced by executing the copied ETL/ELT job definition, which is read and returned to the user in the virtual view.

20 Claims, 6 Drawing Sheets

(56) References Cited

U.S. PATENT DOCUMENTS

| | | | | |
|---|---|---|---|---|
| 8,688,625 | B1* | 4/2014 | Clark | G06Q 10/00 |
| | | | | 707/602 |
| 9,904,684 | B2* | 2/2018 | Zha | G06F 16/128 |
| 10,318,544 | B2* | 6/2019 | Crabtree | G06F 16/254 |
| 10,331,692 | B2* | 6/2019 | Crabtree | G06F 16/254 |
| 2007/0038609 | A1* | 2/2007 | Wu | G06F 16/334 |
| 2007/0276851 | A1* | 11/2007 | Friedlander | G06F 16/283 |
| 2010/0268684 | A1* | 10/2010 | Friedlander | G06F 16/254 |
| | | | | 707/E17.014 |
| 2014/0344211 | A1* | 11/2014 | Allan | G06F 16/258 |
| | | | | 707/602 |
| 2015/0286697 | A1* | 10/2015 | Byrne | G06Q 50/01 |
| | | | | 707/600 |
| 2019/0258645 | A1* | 8/2019 | Crabtree | G06F 16/2379 |
| 2019/0265971 | A1* | 8/2019 | Behzadi | H04L 67/61 |
| 2020/0073987 | A1* | 3/2020 | Perumala | G06F 16/24545 |

OTHER PUBLICATIONS

IBM, "Creating and Using Federated Views," https://www.ibm.com/support/producthub/db2/docs/content/SSEPGG_11.5.0/com.ibm.data.fluidquery.doc/topics/tfpprg09.html, 2021, pp. 1-2.

Bennett et al., "Bridging The Data Integration Gap: From Theory to Implementation," ACM SIGSOFT Software Engineering Notes, vol. 36, No. 3, May 2011, pp. 1-8.

IBM, "Data Connection and Virtualization," https://ibm-developer.gitbook.io/cloudpakfordata-credit-risk-workshop/credit-risk-workshop/data-connection-and-virtualization, 2021, pp. 1-12.

* cited by examiner

CREATING VIRTUALIZED DATA ASSETS USING EXISTING DEFINITIONS OF ETL/ELT JOBS

TECHNICAL FIELD

The present disclosure relates generally to data virtualization, and more particularly to creating virtualized data assets using existing definitions of ETL (extract, transform, load)/ELT (extract, load, transform) jobs.

BACKGROUND

Data virtualization is an approach to data management that allows an application to retrieve and manipulate data without requiring technical details about the data, such as how it is formatted at the source, or where it is physically located, and can provide a single customer view (or single view of any other entity) of the overall data.

SUMMARY

In one embodiment of the present disclosure, a computer-implemented method for creating virtualized data assets comprises receiving a set of extract, transform, load (ETL) or extract, load, transform (ELT) job definitions. The method further comprises translating the set of ETL or ELT job definitions to statements in a domain-specific language. The method additionally comprises creating virtualized data assets using the translated statements. Furthermore, the method comprises representing a federated view for execution of the translated statements that includes the created virtualized data assets.

Other forms of the embodiment of the computer-implemented method described above are in a system and in a computer program product.

In another embodiment of the present disclosure, a computer-implemented method for creating virtualized data assets comprises creating a copy of an extract, transform, load (ETL) or an extract, load, transform (ELT) job definition. The method further comprises creating a table function for triggering execution of the copy of the ETL or ELT job definition and returning data sets. The method additionally comprises receiving a query from a user based on a virtual view, where the query comprises the ETL or ELT job definition. Furthermore, the method comprises executing the table function which triggers execution of the copy of the ETL or ELT job definition in response to receiving the query. Additionally, the method comprises producing the data sets in response to execution of the copy of the ETL or ELT job definition. In addition, the method comprises reading and returning the data sets in the virtual view.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
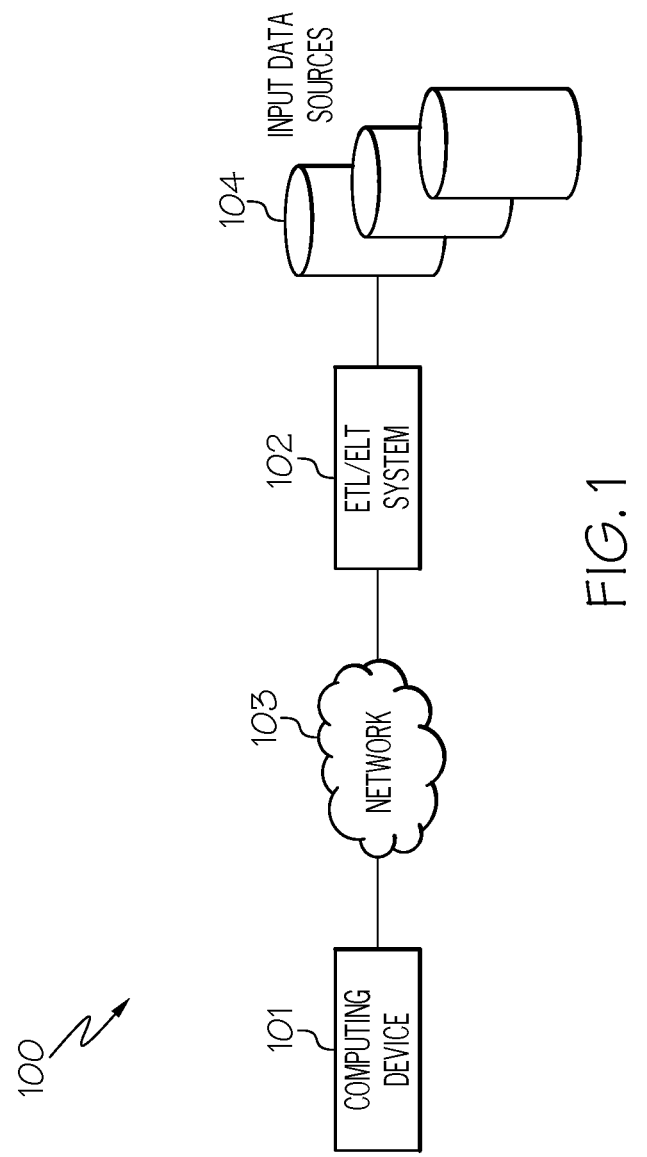
FIG. 1 illustrates a communication system for practicing the principles of the present disclosure in accordance with an embodiment of the present disclosure.

As stated in the Background section, data virtualization is an approach to data management that allows an application to retrieve and manipulate data without requiring technical details about the data, such as how it is formatted at the source, or where it is physically located, and can provide a single customer view (or single view of any other entity) of the overall data.

With respect to using the approach of data virtualization, unlike the traditional extract, transform, load ("ETL") process or extract, load, transform ("ELT") process, the data remains in place, and real-time access is given to the source system for the data. This reduces the risk of data errors and it does not attempt to impose a single data model on the data (an example of heterogeneous data is a federated database system). The technology also supports the writing of transaction data updates back to the source systems. To resolve differences in source and consumer formats and semantics, various abstraction and transformation techniques are used.

Some enterprise landscapes are filled with disparate data sources including multiple data warehouses, data marts, and/or data lakes, even though a data warehouse, if implemented correctly, should be unique and a single source of truth. Data virtualization can efficiently bridge data across data warehouses, data marts, and data lakes without having to create a whole new integrated physical data platform. Existing data infrastructure can continue performing their core functions while the data virtualization layer just leverages the data from those sources. This aspect of data virtualization makes it complementary to all existing data sources and increases the availability and usage of enterprise data.

As a result, enterprises (organizations) attempt to work on virtualized data rather than pay a significant cost of maintaining all the necessary assets, such as in a centralized data warehouse.

Unfortunately, such enterprises may have collected thousands of ETL/ELT ("ETL/ELT," as used herein, refers to ETL or ELT) job definitions to extract, transform and load data, such as in a data warehousing environment. Switching to a virtual data warehouse (set of separate databases, which can be queried together, so that a user can effectively access all the data as if it was stored in one data warehouse) and data virtualization though requires the enterprise to implement a significant number of new definitions for the virtualized data assets. A virtualized data asset, as used herein, refers to the resulting data from the data virtualization process, such as the single, logical and virtual view of information obtained from aggregating data from different sources of information. Such aggregated data is obtained from the data sources by connecting to the data sources (as opposed to collecting the data from the data sources) to fetch such data which is then combined and presented to the user, such as in a single, logical and virtual view of information. However, rewriting thousands of ETL/ELT job definitions into definitions for virtualized data assets in order to obtain such virtualized data assets is a very expensive and inefficient process.

In some embodiments of the present disclosure, the present disclosure comprises a computer-implemented method, system and computer program product for creating virtualized data assets. In one embodiment of the present disclosure, a set of extract, load, transform (ELT) or extract, transform, load (ETL) job definitions are received. The ETL or ELT job definitions are then translated into statements of a domain-specific language (e.g., SQL statements). For example, a table of ETL/ELT stages with corresponding SQL statements may be used to translate the ETL/ELT job definitions to SQL statements. Virtualized data assets may then be created by executing the translated statements. For example, the translated statements may be applied to the input data sources, which are federated, and then implement the transformations via the statements. A virtualized data asset, as used herein, refers to the resulting data from the data virtualization process, such as the single, logical and virtual view of information obtained from aggregating data from different sources of information. Such aggregated data is obtained from the data sources by connecting to the data sources (as opposed to collecting the data from the data sources) to fetch such data which is then combined and presented to the user, such as in a single, logical and virtual view of information. Furthermore, a virtualized data assets catalog is built to store the created virtualized data assets with corresponding ETL or ELT job definitions. A federated view is then represented for the execution of the translated statements which includes the created virtualized data assets. In this manner, virtualized data assets are created by reusing existing ETL/ELT job definitions in a more efficient and inexpensive manner.

In another embodiment of the present disclosure, a copy of an extract, transform, load (ETL) or an extract, load, transform (ELT) job definition is created. Furthermore, a table function is created in which the table function is configured to trigger an execution of a copy of the definition of the ETL/ELT job, to read the resulting data from executing the copy of the definition of the ETL/ELT job and to return the resulting data (data sets), such as to a queue in a federation server. After receiving a query from a user based on a virtual view in which the query includes the ETL or ELT job definition, the table function is executed which triggers the execution of the copy of the ETL or ELT job definition. Data sets are then produced by executing the copied ETL or ELT job definition, which is read and returned to the user in the virtual view. In this manner, virtualized data assets are created by reusing existing ETL/ELT job definitions in a more efficient and inexpensive manner.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a computing device 101 connected to an ETL/ELT system 102 via a network 103. The abbreviation "ETL," as used herein, refers to extract, transform and load; whereas, the abbreviation "ELT," as used herein, refers to extract, load and transform. Furthermore, it is noted that the phrase "ETL/ELT," as used herein, refers to ETL or ELT. A further description of ETL/ELT system 102 is provided further below.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and ETL/ELT system 102. It is noted that both computing device 101 and the user of computing device 101 may be identified with element number 101.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, ETL/ELT system 102 corresponds to a system that copies data from one or more data sources 104 (connected to ETL/ELT system 102 as shown in FIG. 1) into a destination system which represents the data differently from the source(s) 104 or in a different context than the source(s) 104. In connection with such a procedure, the steps of extraction, transformation and load are performed. For example, data extraction involves extracting data from data sources 104. Data transformation processes data by data cleaning and transforming them into a proper storage format/structure for the purpose of querying and analysis. In one embodiment, data transformation is comprised of several sub-processes: cleansing (inconsistencies and missing values in the data are resolved), standardization (formatting rules are applied to the data set), deduplication (redundant data is excluded or discarded), verification (unusable data is removed and anomalies are flagged), sorting (data is organized according to type) and other tasks (any additional/optional rules can be applied to improve data quality). Data loading describes the insertion of data into a destination (e.g., target database), such as an operational data store, a data mart, a data lake or a data warehouse. In one embodiment, data can be loaded all at once (full load) or at scheduled intervals (incremental load). The order of such operations may correspond to extraction, transformation and load ("ETL") or correspond to extraction, load and transformation ("ELT"). Embodiments of the present disclosure include both scenarios.

In one embodiment, such data sources 104 are in a federated environment in which the data sources are combined to form one large data source. Such "federation" is accomplished by utilizing a federation server (also called a "data virtualization server") (discussed further below) that enables multiple data sources to appear as a single data source to the user (e.g., user of computing device 101). An example of such a federation server includes IBM® InfoSphere® DataStage®. In one embodiment, such data sources are disparate data sources including, but not limited to, data warehouses, data marts, and/or data lakes. Other examples include, but not limited to, database and legacy systems, cloud, hybrid and on-premises environments, sales and marketing applications, mobile devices and applications, customer relationship management (CRM) systems, data storage platforms, and analytics tools.

In one embodiment, ETL/ELT system 102 is configured to reuse existing definitions of ETL/ELT jobs to create virtualized data assets in an efficient and inexpensive manner as discussed further below.

In one embodiment, such definitions of ETL/ELT jobs are translated to statements in a domain-specific language (e.g., structured query language (SQL)), which can then be utilized by ETL/ELT system 102 to created virtualized data assets by performing such operations on input data sources 104. A virtualized data asset, as used herein, refers to the integration of enterprise data, such as in a single, logical and virtual view of information obtained from aggregating data from different sources of information.

In another embodiment, ETL/ELT system 102 creates virtualized data assets by creating a table function to trigger an ETL/ELT job, in which the resulting data is read from a queue and returned to the user (e.g., user of computing device 101) in a virtual view.

A more detailed description of these and other functions of ETL/ELT system 102 is provided further below. Furthermore, a description of the software components of ETL/ELT system 102 is provided below in connection with FIGS. 2 and 3 and a description of the hardware configuration of ETL/ELT system 102 is provided further below in connection with FIG. 4.

System 100 is not to be limited in scope to any one particular network architecture. System 100 may include any number of computing devices 101, ETL/ELT systems 102, networks 103 and input data sources 104.

A discussion regarding the software components used by ETL/ELT system 102 to create virtualized data assets by reusing existing definitions of ETL/ELT jobs is discussed below in connection with FIG. 2.

Figure 2:
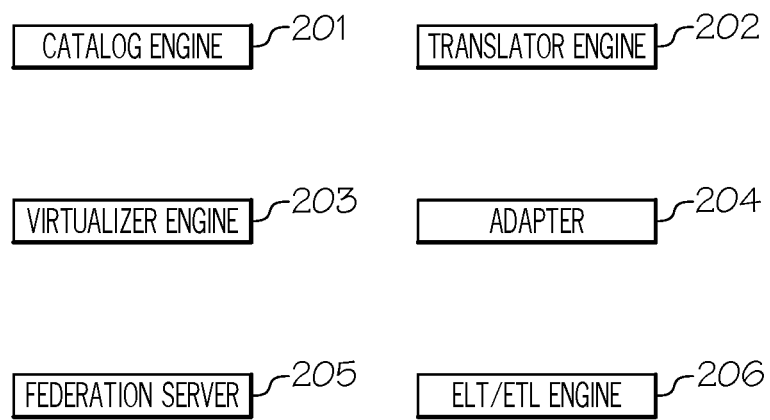
FIG. 2 is a diagram of the software components of the ETL/ELT system used to create virtualized data assets by reusing existing definitions of ETL/ELT jobs in accordance with an embodiment of the present disclosure.

FIG. 2 is a diagram of the software components of ETL/ELT system 102 (FIG. 1) used to create virtualized data assets by reusing existing definitions of ETL/ELT jobs in accordance with an embodiment of the present disclosure.

Referring to FIG. 2, in conjunction with FIG. 1, ETL/ELT system 102 includes a catalog engine 201 configured to build a catalog, such as a catalog referred to herein as the "ETL/ELT jobs catalog," based on a set of ETL/ELT job definitions which are stored in the catalog.

In one embodiment, the ETL/ELT jobs catalog defines how data is extracted, transformed and loaded (ETL) or how data is extracted, loaded and transformed (ELT) based on a set of ETL or ELT job definitions, respectively. For example, suppose that a user wants the historical data as well as current data involving sales data in a shopping mall. Such data is fetched from multiple heterogeneous systems (e.g., input data sources 104), transformed and loaded into a single target system (e.g., ETL/ELT system 102). In another example, one organization may acquire another organization. The data sources for such organizations may be different. As a result, in order to integrate the data from one organization to another organization, an ETL/ELT job is defined in which the data is extracted from the various data sources, transformed and loaded into a single target system.

In one embodiment, the definitions of such ETL/ELT jobs include the specific data sources from which to extract data as well as how the data is to be transformed and where to store the transformed data. For example, a definition of an ETL job could be to extract data from table $T_{in}$ and filter out all the records with the value of the column year before 2000. Such transformed data is to be stored in the database $T_{out}$. In one embodiment, the table $T_{in}$ is a federated table, in which the table is actually a combination of autonomous tables storing various data.

In one embodiment, catalog engine 201 stores such jobs in the ETL/ELT jobs catalog. In one embodiment, such a catalog contains each build and ETL/ELT job definition as well as the associated metadata. In one embodiment, such metadata describes the input and target data sources. In one embodiment, the ETL/ELT job definition is translated into a domain-specific language (e.g., structure query language (SQL) statements). In one embodiment, the ETL/ELT jobs catalog stores such translated ETL/ELT job definitions, which are associated with the corresponding non-translated ETL/ELT job definitions In one embodiment catalog engine 201 further builds a separate catalog, referred to herein as the "queries catalog," which stores both the original ETL/ELT job definition and the associated translated ETL/ELT job definitions (e.g., SQL statements).

In one embodiment, such queries (translated statements) are stored along with the corresponding ETL/ELT job definitions. In one embodiment, such queries (translated statements) may be retrieved from the queries catalog for previously received ETL/ELT job definitions thereby eliminating the need for translator engine 202 to translate the ETL/ELT job definition.

In one embodiment, catalog engine 201 further builds a catalog, referred to herein as the "virtualized data assets catalog," which stores the virtualized data assets that were created based on the existing ETL/ELT job definitions that were translated into the domain-specific language. For example, the translated ETL/ELT job definition (e.g., SQL statements) may be applied to input data sources 104, which are federated, and then implement the transformations via the SQL statements as discussed further below.

In one embodiment, the virtualized data assets catalog stores the created virtualized data assets as well as the corresponding ETL/ELT job definitions/translated ETL/ELT job definitions. In this manner, the created virtualized data assets for a previously executed ETL/ELT job definition will be able to be retrieved in an expeditious manner by ETL/ELT system 102 without translating the ETL/ELT job definition and re-executing such translated statements.

ETL/ELT system 102 further includes a translator engine 202 configured to translate the ETL/ELT job definition into a domain-specific language (e.g., SQL statements). In one embodiment, translator engine 202 utilizes a table of ETL/ELT stages with corresponding SQL statements, such as shown below.

| ETL/ELT STAGES | SQL |
|---|---|
| Filter | WHERE |
| Aggregator | GROUP BY |
| Head | TOP |
| Join | JOIN |
| Lookup | JOIN |
| Sort | ORDER BY |
| Extract | SELECT |

In one embodiment, translator engine 202 utilizes natural language processing to identify the ETL/ELT stages listed in such a table in the ETL/ELT job definitions. Once such stages are identified, such terms are replaced with the corresponding SQL statements found in the table.

For example, in the definition of the ETL/ELT job to extract data from table $T_{in}$ and filter out all the records with the value of the column year before 2000, the ETL/ELT job definition may be translated into the SQL statement of: SELECT*FROM $T_{in}$ WHERE year>2000.

In one embodiment, the stages from the ETL or ELT job definition are represented as user-defined functions.

ETL/ELT system 102 further includes a virtualizer engine 203 configured to create the virtualized data assets based on the ETL/ELT jobs catalog. In one embodiment, the virtualized data assets are created by executing the translated ETL/ELT job definitions (translated into a domain-specific language). By translating such ETL/ELT job definitions into a domain-specific language (e.g., SQL), such virtualized data assets are able to be acquired in a more efficient and less complex manner. For example, if ETL/ELT job definitions are translated into SQL statements, such SQL statements are able to be executed in a faster manner as such ETL/ELT job definitions often include many complex logic, such as joins and data transformations, which require excessive processing time.

In one embodiment, such created virtualized data assets are stored in a federated database.

As discussed above, a virtualized data asset, as used herein, refers to the resulting data from the data virtualization process, such as the single, logical and virtual view of information obtained from aggregating data from different sources of information. Such aggregated data is obtained from the data sources by connecting to the data sources (as opposed to collecting the data from the data sources) to fetch such data which is then combined and presented to the user, such as in a single, logical and virtual view of information.

For example, referring to the example above in which the ETL/ELT job definition was translated into the SQL statement of: SELECT*FROM $T_{in}$ WHERE year>2000, after executing such a SQL statement, data is retrieved from the federated table $T_{in}$ (table is actually a combination of autonomous tables storing various data), where such data is referred to as a "virtualized data asset," since the data is obtained from aggregating data from different sources of information, which is later combined and presented to the user in a single, logical and virtual view of the information, such as via the user interface of computing device 101.

Additionally, ETL/ELT system 102 includes an adapter 204 configured to represent a federated view from the execution of the translated statements that includes the created virtualized data assets or from the ETL/ELT results of the ETL/ELT job execution. A "federated view," as used herein, refers to a view that provides the user (e.g., user of computing device 101) the impression that the data is stored in a single data source as opposed to multiple data sources, such as data sources 104. In one embodiment, adapter 204 is configured to represent a federated view based on the "ETL/ELT sink." The ETL/ELT sink, as used herein, refers to the destination of the transformed data.

Furthermore, ETL/ELT system 102 includes a federation server 205 (e.g., IBM® InfoSphere® Federation Server) configured to enable the user (e.g., user of computing device 101) to access diverse data and content, such as from data sources 104, as if it were a single resource.

In one embodiment, federation provides an optimized and transparent data access and transformation layer with a single relational interface across the data of data sources 104. As a result, federation server 205 is able to provide a single, integrated view ("virtual view") of diverse sources in which the view can be reused in multiple places to create a single point of change.

In one embodiment, federation server 205 uses the metadata of data sources 104 to automate the building and compiling of federated queries. Metadata enables tracing and auditing throughout the federation process. In one embodiment, federated queries can scale to run against the information stored in data sources 104 by using the parallel processing engine of the data integration platform (e.g., IBM® InfoSphere® Information Server).

By using a federated system, requests (e.g., retrieve data) to multiple data sources 104 can be distributed within a single statement, such as a single SQL statement. For example, a user (e.g., user of computing device 101) can join data that is in an IBM® DB2® table, an Oracle® table, a web service and an XML file in a single SQL statement.

In one embodiment, in connection with creating virtualized data assets by reusing existing definitions of ETL/ELT jobs, federation server 205 is configured to create a table function for triggering a job (ETL/ELT job) and returning data. In particular, in one embodiment, the table function is configured to trigger the execution of a copy of a definition of an ETL/ELT job, to read the resulting data from the execution of the copy of the definition of the ETL/ELT job and to return the resulting data, such as to a queue in federation server 205. Later, such data is returned to the user via the virtual view.

Furthermore, ETL/ELT system 102 includes an ETL/ELT engine 206 configured to execute the definitions of ELT/ELT jobs. Examples of such an ETL/ELT engine 206 include, but not limited to, Hevo, Luigi, Blendo, Matillion®, Talend®, StreamSets®, Etleap, etc.

Additionally, in one embodiment, ETL/ELT engine 206 is configured to create a set of ETL/ELT job definitions to use the associated translated statements to be executed against the virtualized data assets of the virtualized data assets catalog. In one embodiment, such created ETL/ELT jobs definitions simply execute the translated statements thereby using fewer processing resources and obtaining such virtualized data assets in a quicker manner. For example, a first ETL job definition may be translated into a first SQL statement. A second ETL job definition may be created by ETL/ELT engine 206 that simply uses the first SQL statement to be executed against the virtualized data assets of the virtualized data assets catalog without including the complexity of the original ETL/ELT job definition. For example, the original ETL/ELT job definition may include a complex graph with various nodes for filtering, aggregation, etc. Such complexity is now removed in the created ETL/ELT job definition.

Figure 3:
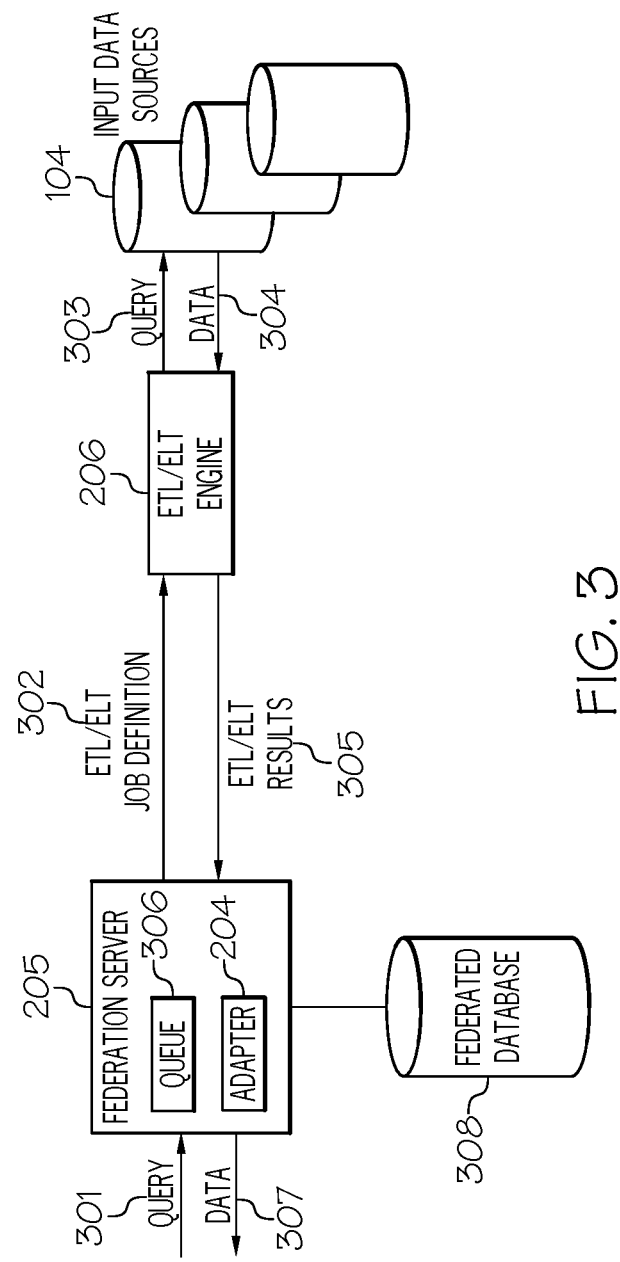
FIG. 3 illustrates creating virtualized data assets by reusing existing definitions of ETL/ELT jobs using the software components of the federation server and the ETL/ELT engine in accordance with an embodiment of the present disclosure.

A further discussion of federation server 205 and ETL/ELT engine 206 is provided below in connection with FIG. 3. FIG. 3 illustrates creating virtualized data assets by reusing existing definitions of ETL/ELT jobs using the software components of federation server 205 and ELT/ELT engine 206 in accordance with an embodiment of the present disclosure.

Referring to FIG. 3, in conjunction with FIGS. 1-2, federation server 205 receives a query 301 from a user, such as the user of computing device 101, to create a virtual view for an ETL/ELT job definition. In response to the request, federation server 205 creates a virtual view by presenting multiple sources of data (e.g., data sources 104) as a single data source, such as by enabling the user access to a federated database 308, which is a virtual database that is a composite of all constituent databases (e.g., data sources 104) in a federated database system. A "virtual view," as used herein, corresponds to a single, integrated view ("virtual view") of diverse sources in which the view can be reused in multiple places to create a single point of change.

Furthermore, in one embodiment, federation server 205 receives an ETL/ELT job definition 302 from the user which is sent to ETL/ELT engine 206 to be executed. Such a job is executed by ETL/ELT engine 206 performing the extraction, transformation and load steps, which includes querying the appropriate data sources 104 (see query 303) to extract the appropriate data (see data 304), which is later translated and loaded (can be performed in the opposite order) to federation server 205 (see ETL/ELT results 305). In one embodiment, such results are stored in a queue 306 in federation server 205.

In one embodiment, the ETL/ELT job that was executed by ETL/ELT engine 206 was copied and modified by federation server 205 to include the requirement to store the results of the execution of the ETL/ELT job in queue 306. In an alternative embodiment, queue 306 may be substituted with a cache so that an ETL/ELT job definition will not need to be re-executed.

In one embodiment, the results of the execution of the ETL/ELT job stored in queue 306 are later returned to the user (see data 307) to be presented to the user in the virtual view.

Furthermore, in one embodiment, federation server 205 may include adapter 204 configured to represent a federated view of the ETL/ELT results 305 to the user (e.g., user of computing device 101). Such an adapter 204 may retrieve the results of the execution of the ETL/ELT job from queue 306 and present the results in a federated view to the user.

Additionally, in one embodiment, a federated database 308 may be connected to federation server 205. A "federated database 308," as used herein, refers to a virtual database that is a composite of all constituent databases (e.g., data sources 104) in a federated database system. In particular, federated database 308 may serve as a container to transparently view and query several other databases through a uniform API (application programming interface) that culls from multiple sources 104 as if they were a single entity. In this manner, data can be viewed and accessed without needing to copy and duplicate it in several databases or manually combining the results from many queries.

A further description of these and other functions (discussed in connection with FIGS. 2-3) is provided below in connection with the discussion of the methods for creating virtualized data assets by reusing existing definitions of ETL/ELT job definitions.

Prior to the discussion of the methods for creating virtualized data assets by reusing existing definitions of ETL/ELT job definitions, a description of the hardware configuration of ETL/ELT system 102 (FIG. 1) is provided below in connection with FIG. 4.

Figure 4:
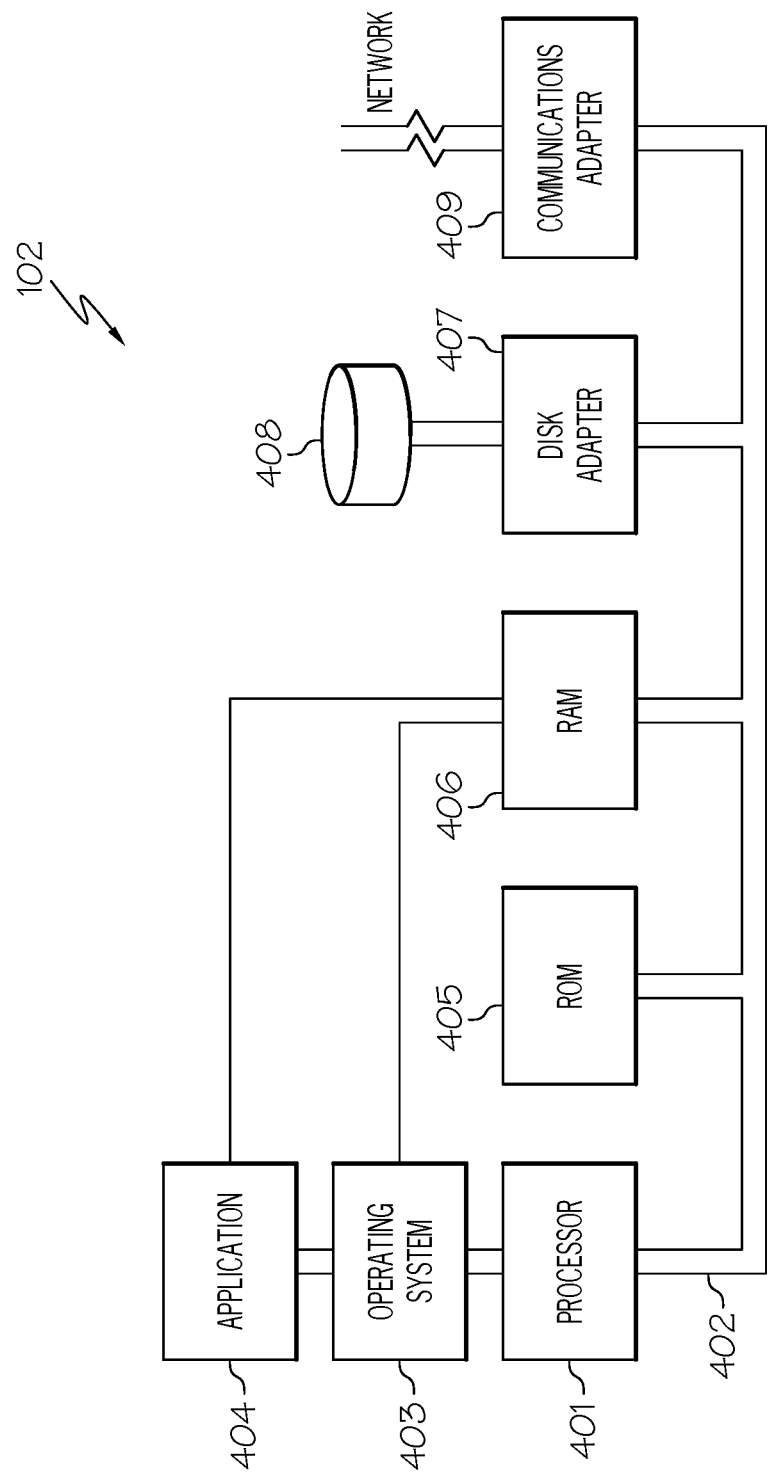
FIG. 4 illustrates an embodiment of the present disclosure of the hardware configuration of the ETL/ELT system which is representative of a hardware environment for practicing the present disclosure.

Referring now to FIG. 4, FIG. 4 illustrates an embodiment of the present disclosure of the hardware configuration of ETL/ELT system 102 (FIG. 1) which is representative of a hardware environment for practicing the present disclosure.

ETL/ELT system 102 has a processor 401 connected to various other components by system bus 402. An operating system 403 runs on processor 401 and provides control and coordinates the functions of the various components of FIG. 4. An application 404 in accordance with the principles of the present disclosure runs in conjunction with operating system 403 and provides calls to operating system 403 where the calls implement the various functions or services to be performed by application 404. Application 404 may include, for example, catalog engine 201 (FIG. 2), translator engine 202 (FIG. 2), virtualizer engine 203 (FIG. 2), adapter 204 (FIG. 2), federation server 205 (FIG. 2) and ETL/ELT engine 206 (FIG. 2). Furthermore, application 404 may include, for example, a program for creating virtualized data assets by reusing existing definitions of ETL/ELT jobs as discussed further below in connection with FIGS. 5-6.

Referring again to FIG. 4, read-only memory ("ROM") 405 is connected to system bus 402 and includes a basic input/output system ("BIOS") that controls certain basic functions of ETL/ELT system 102. Random access memory ("RAM") 406 and disk adapter 407 are also connected to system bus 402. It should be noted that software components including operating system 403 and application 404 may be loaded into RAM 406, which may be ETL/ELT system's 102 main memory for execution. Disk adapter 407 may be an integrated drive electronics ("IDE") adapter that communicates with a disk unit 408, e.g., disk drive. It is noted that the program for creating virtualized data assets by reusing existing definitions of ETL/ELT jobs, as discussed further below in connection with FIGS. 5-6, may reside in disk unit 408 or in application 404.

ETL/ELT system 102 may further include a communications adapter 409 connected to bus 402. Communications adapter 409 interconnects bus 402 with an outside network (e.g., network 103 of FIG. 1) to communicate with other devices, such as computing devices 101, etc.

In one embodiment, application 404 of ETL/ELT system 102 includes the software components of catalog engine 201, translator engine 202, virtualizer engine 203, adapter 204, federation server 205 and ETL/ELT engine 206. In one embodiment, such components may be implemented in hardware, where such hardware components would be connected to bus 402. The functions discussed above performed by such components are not generic computer functions. As a result, ETL/ELT system 102 is a particular machine that is the result of implementing specific, non-generic computer functions.

In one embodiment, the functionality of such software components (e.g., catalog engine 201, translator engine 202, virtualizer engine 203, adapter 204, federation server 205 and ETL/ELT engine 206) of ETL/ELT system 102, including the functionality for creating virtualized data assets by reusing existing definitions of ETL/ELT jobs, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, some enterprise landscapes are filled with disparate data sources including multiple data warehouses, data marts, and/or data lakes, even though a data warehouse, if implemented correctly, should be unique and a single source of truth. Data virtualization can efficiently bridge data across data warehouses, data marts, and data lakes without having to create a whole new integrated physical data platform. Existing data infrastructure can continue performing their core functions while the data virtualization layer just leverages the data from those sources. This aspect of data virtualization makes it complementary to all existing data sources and increases the availability and usage of enterprise data. As a result, enterprises (organizations) attempt to work on virtualized data rather than pay a significant cost of maintaining all the necessary assets, such as in a centralized data warehouse. Unfortunately, such enterprises may have collected thousands of ETL/ELT ("ETL/ELT," as used herein, refers to ETL or ELT) job definitions to extract, transform and load data, such as in a data warehousing environment. Switching to a virtual data warehouse (set of separate databases, which can be queried together, so that a user can effectively access all the data as if it was stored in one data warehouse) and data virtualization though requires the enterprise to implement a significant number of new definitions for the virtualized data assets. A virtualized data asset, as used herein, refers to the resulting data from the data virtualization process, such as the single, logical and virtual view of information obtained from aggregating data from different sources of information. Such aggregated data is obtained from the data sources by connecting to the data sources (as opposed to collecting the data from the data sources) to fetch such data which is then combined and presented to the user, such as in a single, logical and virtual view of information. However, rewriting thousands of ETL/ELT job definitions into definitions for virtualized data assets in order to obtain such virtualized data assets is a very expensive and inefficient process.

Figure 5:
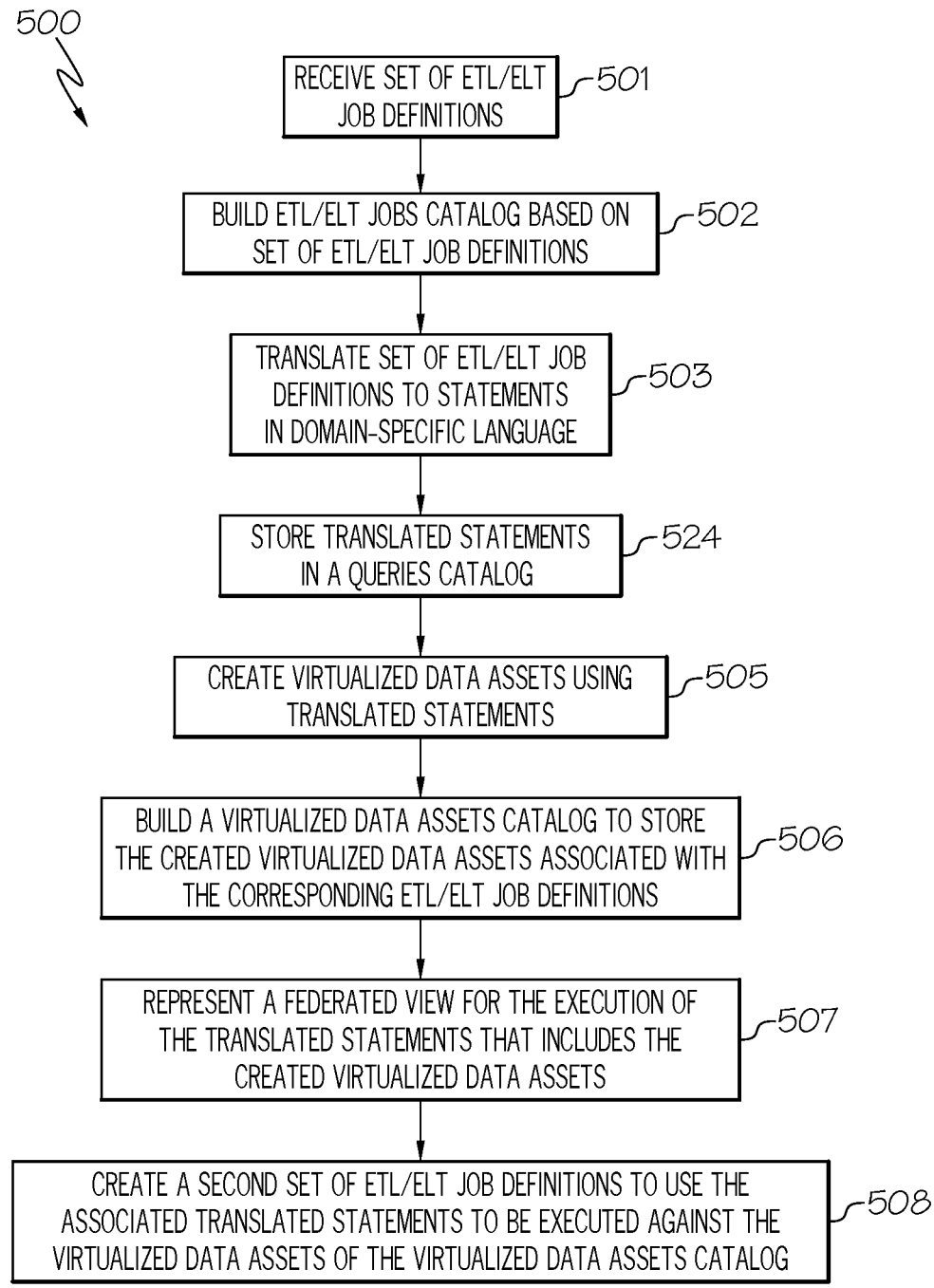
FIG. 5 is a flowchart of a method for creating virtualized data assets by reusing existing definitions of ETL/ELT jobs in accordance with an embodiment of the present disclosure.
Figure 6:
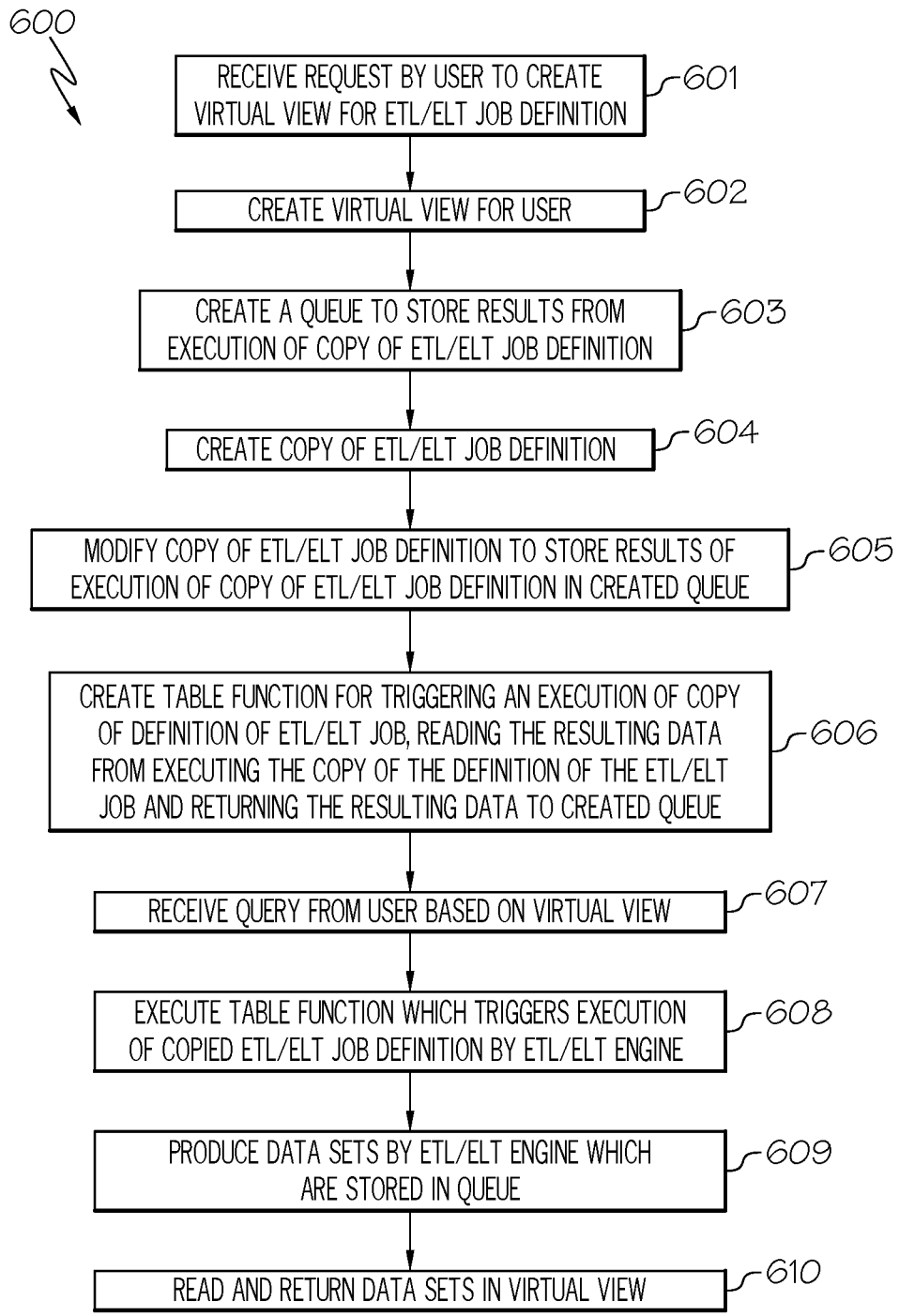
FIG. 6 is a flowchart of an alternative method for creating virtualized data assets by reusing existing definitions of ETL/ELT jobs in accordance with an embodiment of the present disclosure.

The embodiments of the present disclosure provide a means for creating virtualized data assets by reusing existing definitions of ETL/ELT jobs in an inexpensive and efficient manner as discussed below in connection with FIGS. 5-6. FIG. 5 is a flowchart of a method for creating virtualized data assets by reusing existing definitions of ETL/ELT jobs. FIG. 6 is a flowchart of an alternative method for creating virtualized data assets by reusing existing definitions of ETL/ELT jobs.

As discussed above, FIG. 5 is a flowchart of a method 500 for creating virtualized data assets by reusing existing definitions of ETL/ELT jobs in accordance with an embodiment of the present disclosure.

Referring to FIG. 5, in conjunction with FIGS. 1-4, in step 501, catalog engine 201 of ETL/ELT system 102 receives a set of ETL/ELT job definitions (queries). In one embodiment, such job definitions may be provided by a user, such as the user of computing device 101. As previously discussed, such job definitions include the process steps of extraction, transformation and load. For example, suppose that a user wants the historical data as well as current data involving sales data in a shopping mall. Such data is fetched from multiple heterogeneous systems (e.g., input data sources 104), transformed and loaded into a single target system (e.g., ETL/ELT system 102). In another example, one organization may acquire another organization. The data sources for such organizations may be different. As a result, in order to integrate the data from one organization to another organization, an ETL/ELT job is defined in which the data is extracted from the various data sources, transformed and loaded into a single target system.

In one embodiment, the definitions of such ETL/ELT jobs include the specific data sources from which to extract data as well as how the data is to be transformed and where to store the transformed data. For example, a definition of an ETL job could be to extract data from table $T_{in}$ and filter out all the records with the value of the column year before 2000. Such transformed data is to be stored in the database $T_{out}$. In one embodiment, the table $T_{in}$ is a federated table, in which the table is actually a combination of autonomous tables storing various data.

In step 502, catalog engine 201 of ETL/ELT system 102 builds a catalog (referred to herein as the "ETL/ELT jobs catalog") based on the received set of ETL/ELT job definitions.

As previously discussed, in one embodiment, the ETL/ELT jobs catalog defines how data is extracted, transformed and loaded (ETL) or how data is extracted, loaded and transformed (ELT) based on the received set of ETL or ELT job definitions, respectively. For instance, referring to the above example, the ETL/ELT jobs catalog defines how data is extracted from table $T_{in}$, such as filtering out all the records with the value of the column year before 2000, as well as defines how such extracted data is transformed (e.g., cleansing, deduplication, verification, sorting, etc.) and loaded (e.g., transformed data is to be stored in the database $T_{out}$).

In one embodiment, the ETL/ELT jobs catalog is stored in a storage device (e.g., memory 405, disk drive 408) of ETL/ELT system 102.

In step 503, translator engine 202 of ETL/ELT system 102 translates the received set of ETL/ELT job definitions to statements in a domain-specific language (e.g., SQL statements).

As discussed above, in one embodiment, translator engine 202 utilizes a table of ETL/ELT stages with corresponding SQL statements, such as shown below.

| ETL/ELT STAGES | SQL |
|---|---|
| Filter | WHERE |
| Aggregator | GROUP BY |
| Head | TOP |
| Join | JOIN |
| Lookup | JOIN |
| Sort | ORDER BY |
| Extract | SELECT |

In one embodiment, translator engine 202 utilizes natural language processing to identify the ETL/ELT stages that are listed in such a table in the ETL/ELT job definitions. Once such stages are identified, such terms are replaced with the corresponding SQL statements found in the table.

For example, in the definition of the ETL/ELT job to extract data from table $T_{in}$ and filter out all the records with the value of the column year before 2000, the ETL/ELT job definition may be translated into the SQL statement of: SELECT*FROM $T_{in}$ WHERE year>2000.

In step 504, catalog engine 201 of ETL/ELT system 102 stores the translated statements in a catalog, referred to herein as the "queries catalog,"

In one embodiment, such queries (translated statements) are stored along with the corresponding ETL/ELT job definitions. In one embodiment, such queries (translated statements) may be retrieved from the queries catalog for previously received ETL/ELT job definitions thereby eliminating the need for translator engine 202 to translate the ETL/ELT job definition.

In one embodiment, the queries catalog is stored in a storage device (e.g., memory 405, disk drive 408) of ETL/ELT system 102.

In step 505, virtualizer engine 203 of ETL/ELT system 102 creates virtualized data assets, which may be stored in a federated database 308, using the translated statements. As previously discussed, in one embodiment, the virtualized data assets are created by executing the translated ETL/ELT job definitions (translated into a domain-specific language). By translating such ETL/ELT job definitions into a domain-specific language (e.g., SQL), such virtualized data assets are able to be acquired in a more efficient and less complex manner. For example, if ETL/ELT job definitions are translated into SQL statements, such SQL statements are able to be executed in a faster manner as such ETL/ELT job definitions often include many complex logic, such as joins and data transformations, which require excessive processing time.

As discussed above, a virtualized data asset, as used herein, refers to the resulting data from the data virtualization process, such as the single, logical and virtual view of information obtained from aggregating data from different sources of information. Such aggregated data is obtained from the data sources by connecting to the data sources (as opposed to collecting the data from the data sources) to fetch such data which is then combined and presented to the user, such as in a single, logical and virtual view of information.

For example, referring to the example above in which the ETL/ELT job definition was translated into the SQL statement of: SELECT*FROM $T_{in}$ WHERE year>2000, after executing such a SQL statement from the federated table $T_{in}$ (table is actually a combination of autonomous tables storing various data), such data is referred to as a "virtualized data asset," since the data is obtained from aggregating data from different sources of information, which is later combined and presented to the user in a single, logical and virtual view of the information, such as via the user interface of computing device 101.

In step 506, catalog engine 201 of ETL/ELT system 102 builds a catalog (referred to herein as the "virtualized data assets catalog") to store the created virtualized data assets associated with the corresponding ETL/ELT job definitions/translated ETL/ELT job definitions. For example, the translated ETL/ELT job definition (e.g., SQL statements) may be applied to input data sources 104, which are federated, and then implement the transformations via the SQL statements as discussed further below.

In one embodiment, the virtualized data assets catalog stores the created virtualized data assets as well as the corresponding ETL/ELT job definitions/translated ETL/ELT job definitions. In this manner, the created virtualized data assets for a previously executed ETL/ELT job definition will be able to be retrieved in an expeditious manner by ETL/ELT system 102 without translating the ETL/ELT job definition and re-executing such translated statements.

In one embodiment, the virtualized data assets catalog is stored in a storage device (e.g., memory 405, disk drive 408) of ETL/ELT system 102.

In step 507, adapter 204 of ETL/ELT system 102 represents a federated view for the execution of the translated statements that includes the created virtualized data assets.

As discussed above, a "federated view," as used herein, refers to a view that provides the user (e.g., user of computing device 101) the impression that the data is stored in a single data source as opposed to multiple data sources, such as data sources 104. In one embodiment, adapter 204 is configured to represent a federated view based on the "ETL/ELT sink." The ETL/ELT sink, as used herein, refers to the destination of the transformed data.

In this manner, virtualized data assets are created by reusing existing ETL/ELT job definitions in a more efficient and inexpensive manner.

In step 508, ETL/ELT engine 206 of ETL/ELT system 102 creates a second set of ETL/ELT job definitions to use the associated translated statements to be executed against the virtualized data assets of the virtualized data assets catalog. In one embodiment, such created ETL/ELT jobs definitions simply execute the translated statements thereby using fewer processing resources and obtaining such virtualized data assets in a quicker manner. For example, a first ETL job definition may be translated into a first SQL statement in step 503. A second ETL job definition may be created by ETL/ELT engine 206 that simply uses the first SQL statement to be executed against the virtualized data assets of the virtualized data assets catalog without including the complexity of the original ETL/ELT job definition. For example, the original ETL/ELT job definition may include a complex graph with various nodes for filtering, aggregation, etc. Such complexity is now removed in the created ETL/ELT job definition. In one embodiment, the ETL/ELT jobs catalog is modified by catalog engine 201 to replace the received set of ETL/ELT job definitions (stored in the ETL/ELT jobs catalog) with the created second set of ETL/ELT job definitions. In this manner, upon receiving future queries from the user (e.g., user of computing device 101) via the federated view provided to the user in step 507 that includes ETL/ELT job definitions corresponding to such created ETL/ELT job definitions, ETL/ELT engine 206 of ETL/ELT system 102 may efficiently be able to execute such ETL/ELT job definitions against the virtualized data assets catalog by executing the appropriate translated statements stored in the corresponding created ETL/ELT job definitions.

An alternative method for creating virtualized data assets by reusing existing ETL/ELT job definitions is discussed below in connection with FIG. 6.

FIG. 6 is a flowchart of an alternative method 600 for creating virtualized data assets by reusing existing definitions of ETL/ELT jobs in accordance with an embodiment of the present disclosure.

Referring to FIG. 6, in conjunction with FIGS. 1-4, in step 601, federation server 205 of ETL/ELT system 102 receives a request by the user (e.g., user of computing device 101) to create a virtual view for the ETL/ELT job definition.

In step 602, federation server 205 of ETL/ELT system 102 creates a virtual view by presenting multiple sources of data (e.g., data sources 104) as a single data source, such as by enabling the user access to federated database 308, which is a virtual database that is a composite of all constituent databases (e.g., data sources 104) in a federated database system.

As discussed above, a "virtual view," corresponds to a single, integrated view ("virtual view") of diverse sources in which the view can be reused in multiple places to create a single point of change.

In step 603, federation server 205 of ETL/ELT system 102 creates a queue, such as queue 306, to store the results from the execution of a copy of the ETL/ELT job definition.

In step 604, federation server 205 of ETL/ELT system 102 creates a copy of the ETL/ELT job definition. In one embodiment, the copy of the ETL/ELT job definition is stored in ETL/ELT engine 206. In one embodiment, the copy of the ETL/ELT job definition is stored in a storage device of ETL/ELT system 102 (e.g., memory 405, disk drive 408).

In step 605, federation server 205 of ETL/ELT system 102 modifies the copy of the ETL/ELT job definition to store the results of the execution of the copy of the ETL/ELT job definition in the created queue, such as queue 306. By creating and modifying a copy of the ETL/ELT job definition, the original version of the ETL/ELT job definition can be reused as it was originally intended.

In step 606, federation server 205 of ETL/ELT system 102 creates a table function. In one embodiment, the table function is configured to trigger the execution of a copy of the definition of the ETL/ELT job, to read the resulting data from executing the copy of the definition of the ETL/ELT job and to return the resulting data (data sets), such as to queue 306 in federation server 205. Later such data is returned to the user via the virtual view.

In step 607, federation server 205 of ETL/ELT system 102 receives a query from the user (e.g., user of computing device 101) based on the virtual view. In one embodiment, such a query includes an ETL/ELT job definition, such as an ETL/ELT job definition that was previously copied by federation server 205 in step 604. As discussed above, the virtual view corresponds to a single, integrated view ("virtual view") of diverse sources. Hence, the user provides a query that contains a definition of an ETL/ELT job for extracting, transforming and loading data that is presented to the user in a virtual manner, such as data presented from federated database 308.

In step 608, in response to receiving the query that contains an ETL/ELT job definition, federation server 205 of ETL/ELT system 102 executes the table function which triggers the execution of the copied ETL/ELT job definition by ETL/ELT engine 206. Such copied ETL/ELT job definition corresponds to a copy of the ETL/ELT job definition provided by the user in the user's query. In one embodiment, prior to the user requesting to execute an ETL/ELT job definition, such ETL/ELT job definitions are previously provided to federation server 205 to create and modify a copy of such ETL/ELT job definitions to store the results of the job execution in queue 306. In one embodiment, such copied ETL/ELT job definitions are created in ETL/ELT engine 206. In one embodiment, such copied ETL/ELT job definitions are stored in a storage device of ETL/ELT system 102 (e.g., memory 405, disk drive 408).

In step 609, ETL/ELT engine 206 of ETL/ELT system 102 produces the data sets in response to executing the copied ETL/ELT job definition. Examples of such an ETL/ELT engine 206 include, but not limited to, Hevo, Luigi, Blendo, Matillion®, Talend®, StreamSets®, Etleap, etc.

In one embodiment, such data sets are stored in queue 306 as indicated in the copied ETL/ELT job definition.

In step 610, federation server 205 of ETL/ELT system 102 reads and returns the data sets to the user (e.g., user of computing device 101) in the virtual view.

While the foregoing discusses storing such data sets in queue 306, it is noted that such data sets may be stored in a cache thereby eliminating the need to re-execute the ETL/ELT job definition since such data sets can be retrieved from the cache and returned to the user in the virtual view.

As a result of the foregoing, embodiments of the present disclosure provide a means for creating virtualized data assets by reusing existing ETL/ELT job definitions in a more efficient and inexpensive manner.

Furthermore, the present disclosure improves the technology or technical field involving data virtualization. As discussed above, some enterprise landscapes are filled with disparate data sources including multiple data warehouses, data marts, and/or data lakes, even though a data warehouse, if implemented correctly, should be unique and a single source of truth. Data virtualization can efficiently bridge data across data warehouses, data marts, and data lakes without having to create a whole new integrated physical data platform. Existing data infrastructure can continue performing their core functions while the data virtualization layer just leverages the data from those sources. This aspect of data virtualization makes it complementary to all existing data sources and increases the availability and usage of enterprise data. As a result, enterprises (organizations) attempt to work on virtualized data rather than pay a significant cost of maintaining all the necessary assets, such as in a centralized data warehouse. Unfortunately, such enterprises may have collected thousands of ETL/ELT job definitions to extract, transform and load data, such as in a data warehousing environment. Switching to a virtual data warehouse (set of separate databases, which can be queried together, so that a user can effectively access all the data as if it was stored in one data warehouse) and data virtualization though requires the enterprise to implement a significant number of new definitions for the virtualized data assets. A virtualized data asset, as used herein, refers to the resulting data from the data virtualization process, such as the single, logical and virtual view of information obtained from aggregating data from different sources of information. Such aggregated data is obtained from the data sources by connecting to the data sources (as opposed to collecting the data from the data sources) to fetch such data which is then combined and presented to the user, such as in a single, logical and virtual view of information. However, rewriting thousands of ETL/ELT job definitions into definitions for virtualized data assets in order to obtain such virtualized data assets is a very expensive and inefficient process.

Embodiments of the present disclosure improve such technology by receiving a set of extract, load, transform (ELT) or extract, transform, load (ETL) job definitions. The ETL or ELT job definitions are then translated into statements of a domain-specific language (e.g., SQL statements). For example, a table of ETL/ELT stages with corresponding SQL statements may be used to translate the ETL/ELT job definitions to SQL statements. Virtualized data assets may then be created by executing the translated statements. For example, the translated statements may be applied to the input data sources, which are federated, and then implement the transformations via the statements. A virtualized data asset, as used herein, refers to the resulting data from the data virtualization process, such as the single, logical and virtual view of information obtained from aggregating data from different sources of information. Such aggregated data is obtained from the data sources by connecting to the data sources (as opposed to collecting the data from the data sources) to fetch such data which is then combined and presented to the user, such as in a single, logical and virtual view of information. Furthermore, a virtualized data assets catalog is built to store the created virtualized data assets with corresponding ETL or ELT job definitions. A federated view is then represented for the execution of the translated statements which includes the created virtualized data assets. In this manner, virtualized data assets are created by reusing existing ETL/ELT job definitions in a more efficient and inexpensive manner. Furthermore, in this manner, there is an improvement in the technical field involving data virtualization.

Furthermore, embodiments of the present disclosure improve such technology by creating a copy of an extract, transform, load (ETL) or an extract, load, transform (ELT) job definition. Furthermore, a table function is created in which the table function is configured to trigger an execution of a copy of the definition of the ETL/ELT job, reading of the resulting data from executing the copy of the definition of the ETL/ELT job and returning the resulting data (data sets), such as in a queue in a federation server. After receiving a query from a user based on a virtual view in which the query includes the ETL or ELT job definition, the table function is executed which triggers the execution of the copy of the ETL or ELT job definition. Data sets are then produced by executing the copied ETL or ELT job definition, which is read and returned to the user in the virtual view. In this manner, virtualized data assets are created by reusing existing ETL/ELT job definitions in a more efficient and inexpensive manner. Furthermore, in this manner, there is an improvement in the technical field involving data virtualization.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for creating virtualized data assets, the method comprising:
receiving a set of extract, transform, load (ETL) or extract, load, transform (ELT) job definitions;
translating said set of ETL or ELT job definitions to statements in a domain-specific language;
creating virtualized data assets using said translated statements; and
representing a federated view for execution of said translated statements that includes said created virtualized data assets.

2. The method as recited in claim 1 further comprising:
building a first catalog to store said created virtualized data assets with corresponding ETL or ELT job definitions.

3. The method as recited in claim 2 further comprising:
creating a second set of ETL or ELT job definitions to use associated translated statements to be executed against said virtualized data assets of said first catalog.

4. The method as recited in claim 3 further comprising:
building a second catalog defining how data is extracted, transformed and loaded or how data is extracted, loaded and transformed (ELT) based on said set of ETL or ELT job definitions, respectively, wherein said second catalog is modified by replacing said set of ETL or ELT job definitions with said created second set of ETL or ELT job definitions.

5. The method as recited in claim 1, wherein said domain-specific language comprises a structured query language.

6. The method as recited in claim 1, wherein said translation of said set of ETL or ELT job definitions to statements in said domain-specific language is accomplished via a table of ETL or ELT stages with corresponding statements in said domain-specific language.

7. The method as recited in claim 1 further comprising:
storing said translated statements in a third catalog.

8. A computer program product for creating virtualized data assets, the computer program product comprising one or more computer readable storage mediums having program code embodied therewith, the program code comprising programming instructions for:
receiving a set of extract, transform, load (ETL) or extract, load, transform (ELT) job definitions;
translating said set of ETL or ELT job definitions to statements in a domain-specific language;
creating virtualized data assets using said translated statements; and
representing a federated view for execution of said translated statements that includes said created virtualized data assets.

9. The computer program product as recited in claim 8, wherein the program code further comprises the programming instructions for:
building a first catalog to store said created virtualized data assets with corresponding ETL or ELT job definitions.

10. The computer program product as recited in claim 9, wherein the program code further comprises the programming instructions for:
creating a second set of ETL or ELT job definitions to use associated translated statements to be executed against said virtualized data assets of said first catalog.

11. The computer program product as recited in claim 10, wherein the program code further comprises the programming instructions for:
building a second catalog defining how data is extracted, transformed and loaded or how data is extracted, loaded and transformed (ELT) based on said set of ETL or ELT job definitions, respectively, wherein said second catalog is modified by replacing said set of ETL or ELT job definitions with said created second set of ETL or ELT job definitions.

12. The computer program product as recited in claim 8, wherein said domain-specific language comprises a structured query language.

13. The computer program product as recited in claim 8, wherein said translation of said set of ETL or ELT job definitions to statements in said domain-specific language is accomplished via a table of ETL or ELT stages with corresponding statements in said domain-specific language.

14. The computer program product as recited in claim 8, wherein the program code further comprises the programming instructions for:
storing said translated statements in a third catalog.

15. A system, comprising:
a memory for storing a computer program for creating virtualized data assets; and
a processor connected to the memory, wherein the processor is configured to execute program instructions of the computer program comprising:
receiving a set of extract, transform, load (ETL) or extract, load, transform (ELT) job definitions;
translating said set of ETL or ELT job definitions to statements in a domain-specific language;
creating virtualized data assets using said translated statements; and
representing a federated view for execution of said translated statements that includes said created virtualized data assets.

16. The system as recited in claim 15, wherein the program instructions of the computer program further comprise:
building a first catalog to store said created virtualized data assets with corresponding ETL or ELT job definitions.

17. The system as recited in claim 16, wherein the program instructions of the computer program further comprise:

creating a second set of ETL or ELT job definitions to use associated translated statements to be executed against said virtualized data assets of said first catalog.

18. The system as recited in claim 17, wherein the program instructions of the computer program further comprise:

building a second catalog defining how data is extracted, transformed and loaded or how data is extracted, loaded and transformed (ELT) based on said set of ETL or ELT job definitions, respectively, wherein said second catalog is modified by replacing said set of ETL or ELT job definitions with said created second set of ETL or ELT job definitions.

19. The system as recited in claim 15, wherein said domain-specific language comprises a structured query language.

20. The system as recited in claim 15, wherein said translation of said set of ETL or ELT job definitions to statements in said domain-specific language is accomplished via a table of ETL or ELT stages with corresponding statements in said domain-specific language.

* * * * *